Jan. 4, 1927.
W. C. HUDSON
1,612,923
THREAD CUTTING TEMPLE FOR LOOMS
Filed March 20, 1926
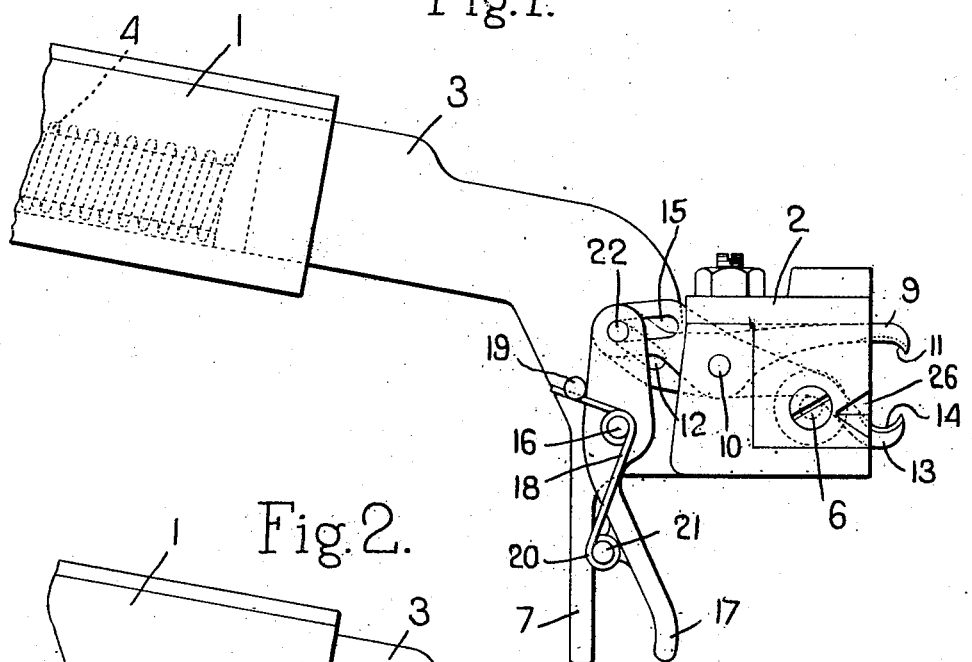
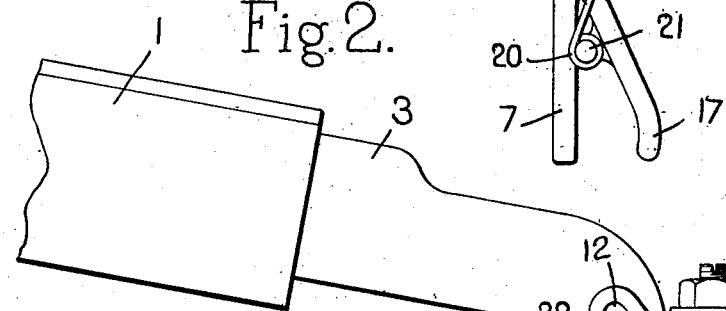
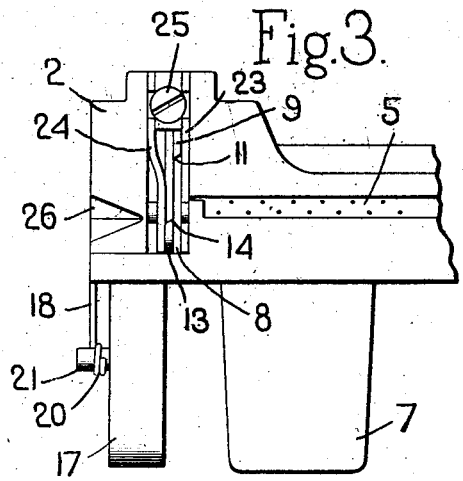
Inventor.
Walter C. Hudson
by Heard Smith & Tennant.
Attys.

Patented Jan. 4, 1927.

1,612,923

UNITED STATES PATENT OFFICE.

WALTER C. HUDSON, OF ANDERSON, SOUTH CAROLINA, ASSIGNOR TO DRAPER CORPORATION, OF HOPEDALE, MASSACHUSETTS, A CORPORATION OF MAINE.

THREAD-CUTTING TEMPLE FOR LOOMS.

Application filed March 20, 1926. Serial No. 96,169.

This invention relates to a thread cutting temple such as is employed particularly in connection with the automatic filling replenishing loom and which acts to sever close to the selvage any filling ends left extending therefrom.

The object of the invention is to provide such a device in which the cooperating cutter members are mounted in fixed position or, in other words, so mounted as to effect their relative opening and closing movements without having any bodily movement.

The object of the invention is further to provide such a device in which relative movement between the cutting members, and preferably the closing movement, is effected by an actuating lever pivotally mounted in the temple head and struck by the lay upon the beat-up.

The object of the invention is further to provide a pair of cooperating shear cutting members mounted in the temple head of a common fixed pivot, together with an actuating lever pivotally mounted in the temple head for effecting the relative movement of the said members.

The object of the invention is further to provide such a device in which the two cooperating shear cutter members present opposed hook-shaped ends projecting rearwardly of the temple head acting to catch and hold the filling before it is severed.

The object of the invention is further to provide a simple and efficient form of thread cutting temple in which the movable parts are all pivotally mounted in the temple head so as to be positioned accurately therein.

These and other objects and features of the invention will appear more fully from the accompanying description and drawings and will be particularly pointed out in the claims.

In the drawings:

Fig. 1 is a view in side elevation of a temple embodying a preferred form of the invention with the parts shown in the position assumed when the cutter members are in open position.

Fig. 2 is a view similar to Fig. 1 with the parts in the position assumed when the cutter members are in closed position.

Fig. 3 is a front elevation of a portion of the temple head showing the means for maintaining the cutter members in engagement.

As the general construction and operation of the thread cutting temple is well known and familiar to those skilled in the weaving art, it is only necessary here to illustrate and describe such a device sufficiently to disclose the present invention.

The temple stand 1 is usually a hollow box-like structure secured in place to the breast beam of the loom. The temple comprises a head portion 2 with a shank 3 extending forwardly therefrom. This shank is mounted to slide longitudinally in the temple stand 1 and is normally held projected rearwardly by the usual spring 4 within the stand and surrounding the shank. The temple head contains the usual pin roll 5 journalled on a stud or studs 6 mounted in the head. The temple head is also provided with the usual depending heel 7 which is struck at each beat-up of the lay to force the temple head with its shank slightly forward. As the lay retracts the spring 4 slides the shank and temple head back to their rearward position.

The cutting instrumentalities are usually mounted in a slot extending vertically in the temple head adjacent the end of the pin roll and such a slot 8 is employed in the present case.

The cutting instrumentalities in this invention comprise a pair of relatively movable shear cutting blades and in the preferred form illustrated both of these blades are movable. Both blades are fixed against bodily movement and preferably this is effected by mounting both blades upon a common fixed pivot so that the blades effect their opening and closing movements by swinging toward and from each other. As illustrated, the upper blade 9 is mounted in the slot 8 and fulcrumed or pivoted on the stud 10 fixed in the temple head. At its rearward end the blade 9 is provided with a downwardly extended hook-shaped bevelled cutting edge 11. At its forward end the blade is provided with a longitudinal slot 12. The lower blade 13 is also mounted in the slot 8 and fulcrumed or pivoted on the same stud 10. At its rearward end it is provided with a similar upwardly facing bevelled hook-shaped cutting edge 14 and at its rearward end also with a longitudinally extending slot 15.

An actuator lever is fulcrumed or pivotally mounted on a stud 16 projecting from the temple head. This lever at its lower end presents a heel 17 to be struck by the lay. A spring 18 is wound about the stud 16 and at its upper end is locked against a stud 19 and at its lower end it is formed into an eye 20 fitting over a stud 21 extending laterally from the heel 17 so that this spring acts normally to swing the actuating lever counter-clockwise or into the position shown in Fig. 1. At its upper end the actuating lever is provided with a laterally extending stud 22 which passes through both the slot 12 and the slot 15 of the cutter blades 9 and 13. The stud 22 and the slots 12 and 15 are so related that as the actuating lever is moved between the positions shown in Fig. 1 and Fig. 2 the opening and closing movements of the cutter members or blades is effected.

It will be seen that the effective ends of the cutter blades 9 and 13 extend well beyond the rear face of the temple head and as the cutting edges are hook-shaped and face each other, the filling ends will be brought between the blades and will be caught and held by the blades before the blades quite close to effect the severing of the filling.

The cutter blades are so shaped as not to interfere with the pin roll stud 6 and to allow as wide an opening movement as possible.

In order to maintain the edges of the blades sharp and insure a clean shearing cut, the blades are held in close contact by any suitable means. For that purpose a construction such as illustrated in the Stimpson Reissue Patent No. 14,420, January 8, 1918, is illustrated. A stationary plate 23 is mounted at one side of the slot 8 in the temple head and a spring plate 24 is mounted in the slot at the opposite side of the blades. A set screw 25 holds these plates in place and the construction is such that the spring plate 24 acts to force the two cutter blades into rubbing contact with each other and against the stationary plate 23.

The operation of the device will be apparent. The elements normally stand in the position shown in Fig. 1, the spring 18 acting to hold the heel 17 of the actuator lever rearward and the stud 22 forward, thus maintaining the cutter blades in separated or open position. As the lay beats up, it engages the heel 17, swinging the actuator lever clockwise against the action of the spring 18, while the stud 22 has a camming action in the slots 12 and 15, gradually forcing together the hook-shaped oppositely facing cutting edges of the two blades. The filling end extends normally across the notch 26 in the temple head and as the blades close the filling end is caught and immediately thereafter severed by the shearing action of the blades held against each other by the spring plate 24 and the stationary plate 23, thus ensuring an accurate, sure and clean cut and bringing the parts into the position shown in Fig. 2. When the lay retracts, the spring 18 at once comes into action, returning the parts to the position shown in Fig. 1.

Having thus described the invention, what is claimed as new, and desired to be secured by Letters Patent, is:

1. A thread cutting temple for a loom comprising a head, a pair of cooperating cutter members mounted for relative cooperating movement in the temple head and held against bodily movement therein with their cutting ends projecting rearwardly of the head, an actuator lever pivoted on the temple and acting when moved in opposite directions to effect respectively the relative opening and closing movement of the cutter members.

2. A thread cutting temple for a loom comprising a head, a pair of cooperating cutter blades pivotally mounted on a common pivot in the temple head with their cutting ends projecting rearwardly of the head, an actuator lever pivoted on the temple and provided with a depending heel, a spring engaging the temple and the lever and acting to move the lever to carry its heel rearwardly, and means connecting the actuator lever and the cutter blades acting to effect the closing movement of the blades as the heel of the actuator lever is moved forwardly and the opening of the blades as the lever is moved in the opposite direction by the spring.

3. A thread cutting temple for looms comprising a head, a pair of cooperating cutter blades each movable toward and from the other and each held against bodily movement in the temple head, and an actuator lever pivotally mounted on the temple, connected to both of said blades, and acting when moved in one direction to effect the closing movement and when moved in the opposite direction to effect the opening movement of the said blades.

4. A thread cutting temple for looms comprising a head, a pair of co-operating cutter members pivotally mounted for relative co-operating movement in the temple head and held against bodily movement therein with their cutting edges projecting rearwardly of the head, an actuator mounted on and carried by the temple head and provided with a depending heel adapted to extend into the path of the lay and means operable by said actuator when its heel is engaged by the lay to effect a swinging cutting movement of said blades and means for moving said actuator in the opposite direction to effect an opening movement of said blades.

In testimony whereof, I have signed my name to this specification.

WALTER C. HUDSON.